US010270914B2

(12) United States Patent
Shaffer et al.

(10) Patent No.: US 10,270,914 B2
(45) Date of Patent: Apr. 23, 2019

(54) ENHANCING CONTACT CENTER CALCULATIONS BASED ON REAL-TIME SPEECH ANALYTICS

(71) Applicant: Avaya Inc., Santa Clara, CA (US)

(72) Inventors: Shmuel Shaffer, Palo Alto, CA (US); Seamus Hayes, County Longford (IE); Paul D'Arcy, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/302,779

(22) Filed: Jun. 12, 2014

(65) Prior Publication Data

US 2015/0215464 A1 Jul. 30, 2015

Related U.S. Application Data

(60) Provisional application No. 61/933,599, filed on Jan. 30, 2014.

(51) Int. Cl.
*H04M 3/523* (2006.01)
*G10L 15/18* (2013.01)
*H04M 3/51* (2006.01)
*G10L 15/08* (2006.01)
*G10L 15/22* (2006.01)

(52) U.S. Cl.
CPC ....... *H04M 3/5238* (2013.01); *G10L 15/1815* (2013.01); *G10L 15/08* (2013.01); *G10L 15/22* (2013.01); *H04M 3/5175* (2013.01)

(58) Field of Classification Search
CPC .. H04M 3/5238; H04M 3/5232; H04M 3/523; H04M 2203/40; H04M 2203/402; H04M 2203/407

USPC ............ 379/265.07, 265.08, 265.1, 265.14, 379/266.01, 266.03, 266.06, 266.08
See application file for complete search history.

(56) References Cited

U.S. PATENT DOCUMENTS 5,206,903 A 4/1993 Kohler et al.
5,828,747 A 10/1998 Fisher et al.
(Continued)

OTHER PUBLICATIONS

Definity Generic 3 Call Vectoring/Expert Agent Selection (EAS) Guide, AT&T Publication No. 555-230-520 (Issue 4, Sep. 1995).
(Continued)

*Primary Examiner* — Antim G Shah
(74) *Attorney, Agent, or Firm* — Stevens & Showalter, LLP (57) ABSTRACT

System and method to calculate expected waiting time of a caller to a calling center, the method including: monitoring, by a monitor circuit, a content of a present communication session; estimating a point of progress of the monitored communication session; comparing the point of progress to a historical statistic; calculating, by a processor, a projection of a duration of a remainder of the present communication session; and providing, by a communication circuit, an expected waiting time (EWT) based upon the projection of the duration of the remainder of the present communication session. Embodiments may include a speech search process to record call progress. The speech search process may inform, diagnose or monitor a call. The speech search process may inform a supervisor of progress, to take action if necessary. The speech search process may dynamically trigger other processes and construct profiles based upon historical data.

20 Claims, 3 Drawing Sheets

(56) References Cited

U.S. PATENT DOCUMENTS

| | | | |
|---|---|---|---|
| 5,905,793 A | 5/1999 | Flockhart et al. | |
| 5,982,873 A | 11/1999 | Flockhart et al. | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 2001/0011217 A1* | 8/2001 | Ammicht | G10L 15/22 704/231 |
| 2005/0069119 A1* | 3/2005 | Erhart | H04M 3/51 379/215.01 |
| 2005/0283475 A1* | 12/2005 | Beranek et al. | 707/6 |
| 2008/0063180 A1* | 3/2008 | Barsness et al. | 379/265.14 |
| 2011/0286592 A1* | 11/2011 | Nimmagadda | 379/266.06 |

OTHER PUBLICATIONS

Gopal Kumar; Examination Report; Indian patent application No. 4126/MUM/2014; dated Sep. 28, 2018; Indian Patent Office; Mumbai, India.

\* cited by examiner

ENHANCING CONTACT CENTER CALCULATIONS BASED ON REAL-TIME SPEECH ANALYTICS

CROSS-REFERENCE TO RELATED APPLICATIONS

This application claims the benefit of U.S. Provisional Patent Application Ser. No. 61/933,599, filed on Jan. 30, 2014, the entire content of which is hereby incorporated by reference in its entirety.

BACKGROUND

Field of the Invention

Embodiments of the present invention generally relate to electronic collaboration sessions, and, in particular, to a system and method for tracking and predicting service completion times using real-time speech analytics of user communications.

Description of Related Art

Contact center management systems often calculate an estimated expected wait time (EWT) of a customer contact based on historical information. The formula for calculating expected wait time is typically derived from the rate at which contacts are answered, relative to the number of contacts in queue, together with other available historical statistics. This calculation is based on historical averages and does not consider any indicators that some calls usually take longer or shorter than the daily average. Indicators are evidence of the temporal progress of a call, relative to a metric.

Expected Wait Time is fundamental to operation of a contact center. EWT is used in a number of scenarios in a contact center environment. First, the contact center may inform a user of the EWT for their call. Providing such estimates is now commonplace, and a caller may become dissatisfied if the contact center does not provide him/her the EWT. Informing a caller of the EWT and offering suggestions or alternative options allows users to decide the best course of action for their circumstances. Second, EWT is used by a contact center to manage workflow and to make a determination regarding how best to route the contact. Third, EWT is used in real-time reporting of contact center status in order to display queue metrics to contact center supervisors. Fourth, EWT is used to compute other contact center metrics, e.g., when calculating performance relative to a Service Level Agreement (SLA) for a given work queue.

Despite expected wait time being a key metric in the day-to-day operation of the contact center, the computed value of EWT is an estimated value, and known methods of calculating EWT are not sufficiently accurate. The operation of a contact center could be significantly enhanced with a more accurate value. Therefore, a need exists to provide improved estimates of expected wait time, in order to provide more efficient contact center operation, and ultimately improved customer satisfaction.

SUMMARY

Embodiments of the present invention generally relate to contact center operation and, in particular, to a system and method for calculating more accurately the expected wait time by use of real-time speech analytics.

In one embodiment, a method to calculate expected waiting time of a caller to a calling center includes: monitoring, by a monitor circuit, a content of a present communication session; estimating a point of progress of the monitored communication session; comparing the point of progress to a historical statistic; calculating, by a processor, a projection of a duration of a remainder of the present communication session; and providing, by a communication circuit, an expected waiting time (EWT) based upon the projection of the duration of the remainder of the present communication session.

In one embodiment, a method to calculate expected waiting time of a caller to a calling center includes: a processor coupled to a memory; a monitor circuit configured to monitor content of a present communication session; an estimation module configured to estimate a point of progress of the monitored communication session; a comparison module configured to compare the point of progress to a historical statistic; calculating, by a processor, a projection of a duration of a remainder of the present communication session; and providing, by a communication circuit, an expected waiting time (EWT) based upon the projection of the duration of the remainder of the present communication session.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize automated methods to detect and diagnose quality of service problems associated with an electronic communication session such as an online electronic collaboration system.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 4566) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically RTP will be sent on an even-numbered user datagram protocol ("UDP") port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

Figure 1:
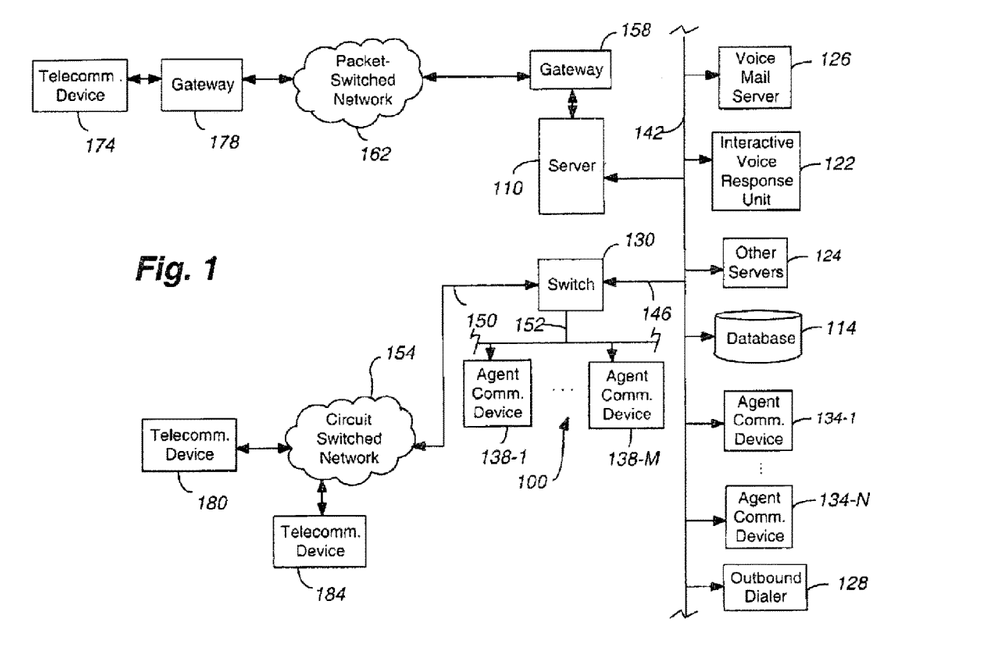
FIG. 1 is a block diagram depicting a system in accordance with an embodiment of the present invention.

Referring now to FIG. 1, which is a block diagram depicting a contact center in accordance with an embodiment of the present invention, there is provided a contact center 100. The contact center generally comprises a central server 110, a set of data stores or databases 114 containing contact or customer related information and other information that can enhance the value and efficiency of the contact, and a plurality of servers, for example, a voice mail server 126, an Interactive Voice Response unit or "IVR" 122, and other servers 124, an outbound dialer 128, a switch 130, a plurality of working agents operating packet-switched (first) telecommunication devices 134-1 to N (such as, but not limited to, computer work stations or personal computers), and/or circuit-switched (second) telecommunication devices 138-1 to M, all interconnected by a local area network LAN (or wide area network WAN) 142. The servers can be connected via optional communication lines 146 to the switch 130.

As will be appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The gateway 158 may comprise Avaya Inc.'s, G250™, G350™, G430™, G450™, G650™, G700™, and IG550™ Media Gateways and may be implemented as hardware such as, but not limited to, via an adjunct processor (as shown) or as a chip in the server.

The first telecommunication devices 134-1, . . . 134-N are packet-switched device, and may include, for example, IP hardphones, such as the Avaya Inc.'s, 1600™, 4600™, and 5600™ Series IP Phones™; IP softphones running on any hardware platform such as PCs, Macs, smartphones, or tablets, (such as Avaya Inc.'s, IP Softphone™); Personal Digital Assistants or PDAs; Personal Computers or PCs, laptops; packet-based H.320 video phones and/or conferencing units; packet-based voice messaging and response units; and packet-based traditional computer telephony adjuncts.

The second telecommunication devices 138-1, . . . 138-M are circuit-switched. Each of the telecommunication devices 138-1, . . . 138-M corresponds to one of a set of internal extensions, for example, Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner.

The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that embodiments of the present invention do not require any particular type of information transport medium between switch or server and first and second telecommunication devices, i.e., embodiments of the present invention may be implemented with any desired type of transport medium as well as combinations of different types of transport media.

The packet-switched network 162 of FIG. 1 may comprise any data and/or distributed processing network such as, but not limited to, the Internet. The network 162 typically includes proxies (not shown), registrars (not shown), and routers (not shown) for managing packet flows. The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol or SIP compatible and may include interfaces for various other protocols such as, but not limited to, the Lightweight Directory Access Protocol or LDAP, H.248, H.323, Simple Mail Transfer Protocol or SMTP, IMAP4, ISDN, E1/T1, and analog line or trunk.

It should be emphasized the configuration of the switch, server, user telecommunication devices, and other elements as shown in FIG. 1 is for purposes of illustration only and should not be construed as limiting embodiments of the present invention to any particular arrangement of elements.

In handling incoming calls, a contact center is capable of exchanging Internet Protocol (IP) data packets, Session Initiation Protocol (SIP) messages, Voice over IP (VoIP) traffic, and stream-related messages (e.g., Real Time Streaming Protocol (RTSP) messages, etc.) with calling endpoints such as endpoint 202. As those who are skilled in the art will appreciate, after reading this specification, contact center 210 is capable of communicating by using other protocols, in some alternative embodiments.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to route, and then forward the contact to a specific contact center resource such as, but not limited to, the IVR unit 122, the voice mail server 126, the instant messaging server, and/or first or second telecommunication device 134, 138 associated with a selected agent. The server 110 distributes and connects these contacts to telecommunication devices of available agents, based on the predetermined criteria noted above.

When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In the CRM environment, both real-time and non-real-time contacts may be handled and distributed with equal efficiency and effectiveness. The server 110 may use a work assignment algorithm that, for example, does not use a queue. In any event, the contact may have associated or "known" contact information. This contact information may include, for example, how long the contact has been waiting, the contact's priority, the contact's media channel, the contact's business value, etc. The contact may be handled based on such known contact information.

The server and/or switch can be a software-controlled system including a processing unit (CPU), microprocessor, or other type of digital data processor executing software or an Application-Specific Integrated Circuit (ASIC) as well as various portions or combinations of such elements. The memory may comprise random access memory (RAM), a read-only memory (ROM), or combinations of these and other types of electronic memory devices. Embodiments of the present invention may be implemented as software, hardware (such as, but not limited to, a logic circuit), or a combination thereof.

The contact center 100, in one configuration, includes an automated instant messaging server as another server 124. In such an embodiment, when a customer initiates contact with the contact center 100 using instant messaging (IM), a new instant messaging thread is initiated by the customer. As will be appreciated, instant messages are stand-alone messages, and threading (or associating instant messages with data structures associated with an instant messaging session between a customer and an agent) occurs at the application level. The association is typically effected by pairing an electronic address (e.g., IP address, Media Access Control (MAC) address, telephone number, mobile-device identifier, and the like) of the customer's communication device with an electronic address (e.g., IP address, MAC address, telephone number, mobile-device identifier, and the like) of the agent's communication device in a manner similar to that used for a voice call.

The instant messaging server can be configured to send an automated response, such as "Please wait while I connect you with an agent" and/or to send the instant message to an automated interactive response unit for data collection. The instant messaging server subsequently notifies the server 110 of the existence of a new instant messaging contact, and the server 110 decides whether a suitable (human) agent is available. If an agent is available, the server 110 instructs the instant messaging server to redirect the instant messaging conversation to that available agent's communication device 134-1 . . . N. The server 110 routes, substantially in real-time, subsequent instant messages from the agent's communication device to the customer's communication device and from the customer's communication device to the agent's communication device.

Figure 2:
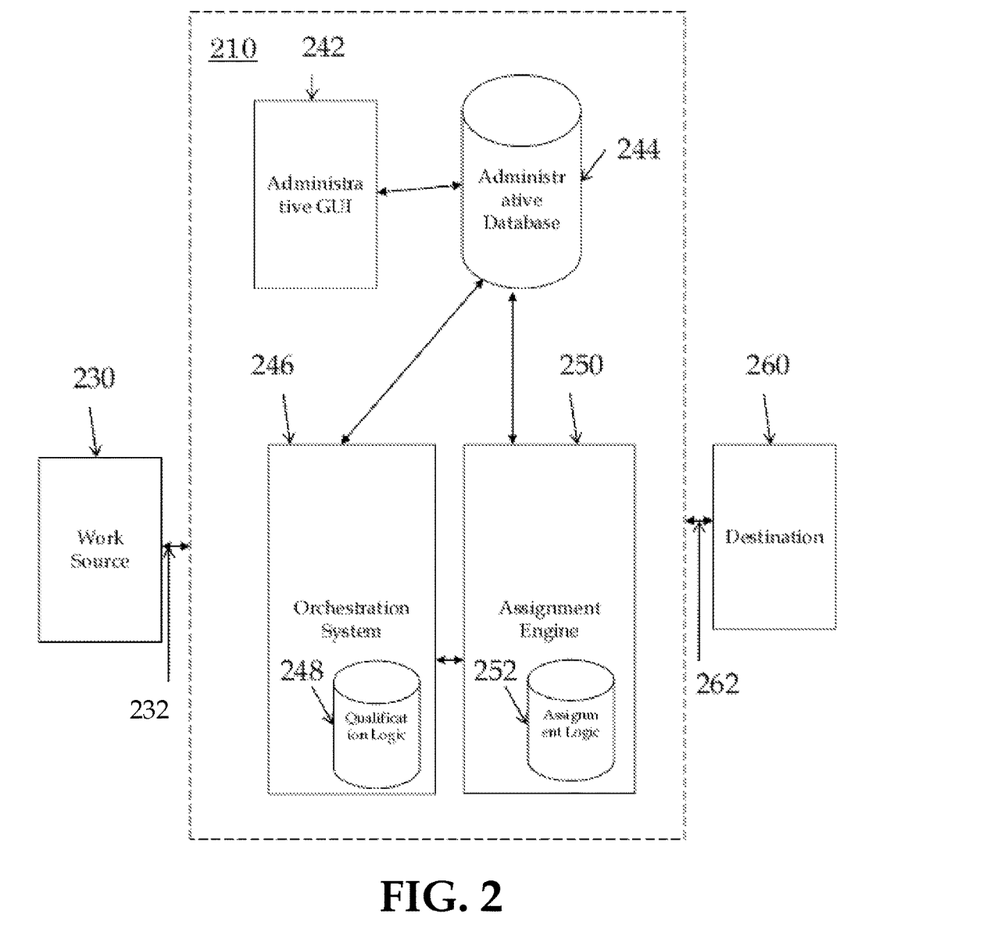
FIG. 2 illustrates at a high level of abstraction a server in accordance with an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include a Basic Call Management System (BCMS) (not shown) and a Call Management System (CMS) (not shown) that gathers call records and contact-center statistics for use in generating contact-center reports.

The switch 130 and/or server 110 can be any computer and/or telecommunication architecture for directing contacts to one or more telecommunication devices to be serviced by one or more preferred agents. Illustratively, the switch and/or server 110 can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Private-Branch Exchange (PBX)-based ACD system; MultiVantage™ PBX, CRM Central 2000 Server™; Communication Manager™, and/or S8300™ media server.

Typically, the switch/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (NIC) (not shown) to provide services to the serviced telecommunication devices. Other types of known switches and servers are well known in the art and therefore not described in detail herein.

Referring again to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and are either enqueued in individual ones of the contact queues 208a-n in their respective orders of priority or are enqueued in different ones of a plurality of contact queues that correspond to a different priority.

Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill. Each one of which corresponds to a different expertise level. Although depicted for clarity sake as skills of the agents, these queues equally may represent agent attributes or some other parameters such that the agents are matched up with contacts on a preferred agent basis.

In one embodiment of the present invention, as depicted in FIG. 2, a contact vector (queue) 216 is included among the control programs in the server 110. Contacts incoming to the contact center may be assigned by contact vector 216 to different contact queues 208a-n based upon a number of predetermined criteria, including customer identity, customer needs, contact center needs, current contact center queue lengths, customer value, and the agent skill, attributes or other parameters required for the proper handling of the contact and being designated as a preferred agent for a particular contact.

Agents who are determined to be preferred agents for a given contact, and are available for handling said contacts are assigned to agent queues 212a-n based upon the skills or attributes they possess. An agent may have multiple skills, attributes or other parameters, and hence may be assigned to multiple agent queues 212a-n simultaneously. Furthermore, an agent may have different levels of skill expertise (e.g., skill levels 1–N in one configuration or merely primary skills and secondary skills in another configuration), and hence may be assigned to different agent queues 212a-n at different expertise levels. Call vectoring is described in Communication Manager Communications System Generic 3. Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 2, which depicts a block diagram of a server 210 in accordance with an embodiment of the present invention, there is provided a server 210 in communication with a work source 230, which may comprise customer or any other entity capable of originating a transmission of work or a contact. The server 210 may be configured in communication with the work source 230 generally via a work source communication means 232, which may comprise any means of communicating data, for example, one or more trunks, phone lines, wireless connections, Bluetooth connections, digital connections, analog connection, combinations thereof, and the like.

In some embodiments of the present invention, the server 210 may also be in communication with a destination 260, which may comprise an agent or any entity capable of receiving a transmission of work or a contact. The server 210 may be configured in communication with the destination 260 generally via an agent communication means 262, which may comprise any means of communicating data, for example, a voice-and-data transmission line such as LAN and/or a circuit switched voice line, wireless connections, Bluetooth connections, digital connections, analog connections, combinations thereof, and the like. The server 210 may comprise any type of computer server, for example, a Basic Call Management System ("BCMS") and a Call Management System ("CMS") capable of segmenting work.

The server 210 can be any architecture for directing contacts to one or more telecommunication devices. Illustratively, the server may be a modified in the form of Avaya Inc.'s Private-Branch Exchange (PBX)-based ACD system; MultiVantage™ PBX, CRM Central 2000 Server™, Communication Manager™, Business Advocate™, Call Center™, Contact Center Express™, Interaction Center™, and/or S8300™, S8400™, S8500™, and S8700™ servers; or Nortel's Business Communications Manager Intelligent Contact Center™, Contact Center—Express™, Contact Center Manager Server™, Contact Center Portfolio™, and Messaging 100/150 Basic Contact Center™.

In many embodiments, the server 210 may be a stored-program-controlled system that conventionally includes, for example, interfaces to external communication links, a communications switching fabric, service circuits (e.g., tone generators, announcement circuits, and the like.), memory for storing control programs and data, and a processor (i.e., a computer) for executing the stored control programs to control the interfaces and the fabric and to provide automatic contact-distribution functionality. The server 210 generally may include a network interface card (not shown) to provide services to the serviced telecommunication devices.

The server 210 may be configured for segmenting work in the contact center and may comprise an administrative database 244 configured to store at least a common skill option and a service skill option; an administrative graphical user interface ("GUI") 242 for accessing at least the administrative database 244 and configuring the common skill option and the service skill option; an orchestration system 246 configured to receive a contact from a work source 230 and orchestrate the contact according to a qualification logic stored in a qualification logic database 248; and an assignment engine 250 configured to receive the contact, the common skill option, and the service skill option, and segment the contact according to an assignment logic stored in an assignment logic database 252. In accordance with some embodiments of the present invention, the qualification logic stored in the qualification logic database 248 and the assignment logic stored in the assignment logic database 252 may comprise any logical set of steps or sequences configured to process data at the contact center in accordance with any embodiment of the present invention.

The server and/or switch can be a software-controlled system including a processing unit (CPU), microprocessor, or other type of digital data processor executing software or an Application-Specific Integrated Circuit (ASIC) as well as various portions or combinations of such elements.

Automatic Call Distribution ("ACD") is a communication server software feature that processes incoming, outgoing, and internal calls and distributes them to groups of extensions called hunt groups or splits. The communication server also sends information about the operation of the ACD to the Call Management System ("CMS") which stores and formats the data and produces real-time and historical reports on ACD activity. ACD is used by a contact center to route incoming calls to specifically assigned splits/skills and agents. ACD allows a system administrator to create an efficient call management environment.

Presently available systems to estimate expected waiting time to respond to a customer contact (e.g., voice call, video call, chat/IM session, etc.) rely on historical information to derive an estimated expected wait time. Because any specific contact may take different time than the average, existing call centers operate based on statistical but inaccurate estimated data.

Embodiments in accordance with the present disclosure may use indicators as evidence to gauge or measure the temporal progress of a call, relative to a metric such as a historical statistic (e.g., average, average plus one standard deviation, etc.) or a target (e.g., a time limit). Indicators provide indication of how a conversation is progressing, in real-time. For example, indicators may be used to help identify a customer calling a help desk who is taking a long time to provide required details that the agent needs in order to assist in resolving the issue. Indicators may include actions by an agent (e.g., placing the customer on hold), or the length of time it takes to perform a subtask (e.g., how long it takes for an agent to find the customer details in a CRM system).

System 100 of FIG. 1 may be used to support more accurate calculations of EWT. Calculation of EWT is useful for calls that are assigned to a callee (e.g., to a contact center agent or similar many-to-one mapping) by an ACD system, or for calls in which a caller may need to wait for a callee (e.g., the caller needs to wait for an agent that possesses a predetermined skill or skill set). In contrast, EWT has less relevance to a one-to-one mapping of a caller to a callee (e.g., a point-to-oint call).

Embodiments in accordance with the present disclosure may use system 100 for substantially real-time detection of words and phrases spoken by the agent and/or the caller in order to estimate a point of progress (i.e., a progress point) in the present call. The detection may be real-time to within a resolution of time that is small compared to the estimated length of the remainder of the call. Embodiments may be useful when the call is expected to progress along a predictable progression or script. A speech semantics engine and/or a speech analytics may monitor an audio and/or video media stream and may identify (e.g., measure) the point of progress of a voice call in real-time (i.e., during the call) in order to forecast more accurately an expected duration of the call. Speech analytics may refer to a process of searching a speech session for a given phrase or set of phrases. Speech semantics (also referred to as semantic assertion) typically refers to a process of inferring the meaning of voice conversation based on matching given phrase or phrases. The real-time identification is provided to a contact center application (e.g., Avaya Collaboration Environment 3.0™), which in turn dynamically updates the expected wait time and provides the updated EWT for further contact center operation.

Embodiments in accordance with the present disclosure may calculate a projection of an amount of time for the present call to conclude, based upon a point of progress of the current call. The amount of time for the present call to conclude may be used as datum to estimate the EWT of subsequent callers. For example, if the present call has taken 20% longer than average to be at the present point of progress, embodiments may estimate that the remainder of the call will also take 20% longer. In some embodiments, the average may be based upon previous calls that share some predetermined characteristics with the present call.

In some embodiments, an EWT reported to a waiting caller may be longer than the average EWT calculated from historical data. For example, embodiments may report the average plus one standard deviation to the user as the EWT. This may represent a conservative estimate for the user to set a low expectation. Such a conservative estimate may also accommodate user perceptions, in which a wait of a predetermined length (e.g., one minute) may be perceived by a waiting user as being longer (e.g., >1 minute). If the actual waiting time is less than the conservative estimate, then the user is more likely to be pleasantly surprised. In contrast, if a EWT based upon just an average is reported to the user, then approximately half the time the user will experience a greater EWT, causing a greater likelihood that the user will be dissatisfied. In some further embodiments, the EWT used for other operational purposes in the contact center may be different that the EWT provided to the caller, e.g., the EWT for operational purposes may be the calculated average without a standard deviation.

In some embodiments, the estimate may take into account separate estimates for different types of questions. For example, if answers for relatively straightforward questions has been average (e.g., questions asking name, phone number, etc.), but more open-ended questions have taken longer to answer (e.g., "why are you calling today"?), a projection for completing the current call may be weighted according to the category of remaining questions, and relatively how long this caller has taken to answer previous question of the same respective category, and how many questions of each category remain to be answered.

As part of the contact center application, embodiments in accordance with the present disclosure may further include a real-time speech search engine (e.g., the Avaya™ Aurix™ speech search engine). The real-time speech search engine may enable a search of a monitored voice call based on the semantic meaning of the conversation rather than simply an audio match of the call. The real-time speech search engine may also generate a real-time notification when a match to a predetermined condition is found during a live conversation. Predetermined conditions may include the occurrence of certain words, phrases, semantic equivalents of the words and phrases, and related timing (e.g., within "X" number of words or seconds within each other, etc.). Usage of the real-time speech search engine enables a more accurate and/or reliable detection of a point of progress in the call by the contact center application. The monitoring may be carried out for some or all in-progress calls to the contact center, concurrently. By monitoring other calls active in the same queue/skill, a more accurate measurement for expected wait time can be obtained for the overall contact center, for in-progress and future calls.

In some embodiments in accordance with the present disclosure, a video feed may be monitored in order to estimate a point of progress of a video call. The video may be monitored for visible actions such as gestures, lip and/or facial movements, textual presentation of required disclosures that may accompany a spoken disclosure, answers from a caller, and so forth.

Embodiments in accordance with the present disclosure may be further illustrated by reference to a usage scenario. The usage scenario below is not limiting but rather exemplary, and other usage scenarios are contemplated. The usage scenario is useful for an audio or video communication session. The usage scenario begins by assuming that a contact center agent working at a financial services company may be handling an incoming call related to a loan application request. Depending upon the subject matter of the call, certain questions, statements and/or disclosures may be required to be read by the agent to the caller, e.g., legal disclosures or disclaimers, requests for certain information, etc. Conversely, depending upon the subject matter, the caller may be required to disclose certain information, such as a residential address, telephone number, social security number (SSN), etc. During the call, the agent may be required to capture and input customer response information into a banking contact center application program. The banking contact center application program may be accessible via, and integrated with, an agent user interface on the agent's terminal, such as Avaya™ Agent Desktop. The agent user interface is an interface that the agent experiences at his/her terminal when interacting with a contact center application program such as the banking contact center application programs.

To aid the contact center agent, the contact center application program may be configured to recognize substantially all questions and phrases that must be uttered during the call (e.g., uttered by the agent reading a required disclosure, the agent asking for a SSN, the caller providing a SSN, and so forth). On the agent's user interface, a policy adherence display may be visible or accessible as part of the agent user interface. The policy adherence display may inform the agent what required statements the agent must read to the caller, when the required statements the agent must be read, and/or what required statements have not yet been read by the agent to the caller. The policy adherence display may update dynamically when there is a speech search match between what the agent has uttered and a required statement. A match may be declared by the contact center application program when a statistical confidence of the match exceeds a predetermined threshold.

When calculating a statistical confidence of a match, certain groups of words such as nouns and verbs may be weighted more heavily than other words such as prepositions. For example, the agent may be required to obtain the customer's social security number. Although a preferred question from the agent to ask for the caller's SSN may be "What is your social security number?", the agent intentionally or unintentionally may deviate from the script by saying similar phrases such as "What's your social security number?", "What's your social?", or simply "Social Security Number?" with an inflection to indicate that a question is intended. Membership in the group of words may change with the nominal question being asked (e.g., a question asking the caller's address would have different groups of words to monitor for). Here, the word "social" may be a member of a group of words having the highest weighting; the word "security" may be a member of a group of words having a relatively lesser but still high weighting, and the word "what" may be a member of a group of words having a relatively low weighting. Once the agent requests this information, the display on the agent's terminal (e.g., an Agent Desktop interface) may dynamically update in order to indicate that the required phrase has been uttered, e.g., as part of a policy adherence.

In addition to updating a policy adherence display on an agent's desktop, embodiments in accordance with the present disclosure may augment the contact center application program by including a speech search plug-in process in order to record progress of the call. The speech search plug-in process may be used to inform, diagnose and/or to monitor a call based upon a speech signal from the call. For example, the speech search plug-in process may be configured to inform a supervisor, via their desktop client, that a predetermined phrase has been uttered by a customer or agent, such that the predetermined phrase may require the supervisor to observe the call or to actively participate in the call.

Additionally, the speech search plug-in may be integrated with other business process applications concurrently executing in the contact center (e.g., a workflow applications) in order to dynamically trigger a background work processes based upon speech search matches. For example, if a customer during a call utters the phrase "I read an advertisement for your product in this morning's paper," detection of this phrase may trigger a workflow process to update a backend database with information about the caller for marketing purposes. By monitoring calls in real-time, the plug-in process may be able to construct a profile based upon historical data.

The profile may include data based upon collecting details for all calls, which in turn is used to derive a standard set of metrics and/or measurements. An example of a metric may be an amount of time a caller takes to answer a question. Measurements may include, for example, sufficient data to calculate an average amount of time that it takes for customers to respond with their SSN number when requested. The profile may include information that indicates when or under what circumstances a customer may provides responses immediately, or when or under what circumstances additional time may be required. For example, some customers may be able to provide their social security number immediately (i.e., from memory), while other customers may need to look up the information. In this example, the speech search plug-in may match the request for a SSN number by the agent to the customer response. Based on historical data, derived from measurements of previous calls, a statistic (e.g., an average) may be calculated for how long customers typically take to respond. This is compared with the current call to determine if it is within this statistic. Such a process allows embodiments to predict if the call will complete within a pre-determined estimated time, or whether additional time will be required (e.g., because the customer takes additional time to provide their social security number). By proactively monitoring the calls, embodiments are able to determine an average duration for a call, which provides a more accurate expected wait time, thus improving the customer experience as well as the overall contact center operations. By comparing each piece of information to historical statistics, embodiments may dynamically update an estimated time to complete a call, thus providing a more accurate figure.

Some embodiments in accordance with the present disclosure may try to predict or forecast whether the rest of a call from this caller will be fast or slow, e.g., take more or less time than a predetermined statistic. For example, if there are ten pieces of information that the caller must supply, and if the caller took twice as long as average to supply the first two pieces of information, then embodiments may estimate that the last eight pieces of information will also take about twice as long as average. A statistical confidence of this estimate may improve as the actual response times of more pieces of information is known and fewer are unknown.

By calculating and providing a more accurate expected wait time, embodiments in accordance with the present disclosure may enable contact center applications to make more intelligent decisions regarding how to route contacts, based on real-time information. The more accurate expected wait time may also be provided to customers in order to improve customer satisfaction.

Embodiments are not limited to voice or video calls. In accordance with another embodiment in accordance with the present disclosure, embodiments may proactively monitor multi-media contacts in real-time in order to provide a more accurate expected wait time. Using chat server applications, social media gateway applications and the like, a communication session between a contact center and a caller using substantially any communication mode supported by the contact center (e.g., web communication/Social Media/SMS and IM conversations and the like) may be monitored in real-time in order to track their progress of the communication session towards completion. With more accurate information about progress of the communication session, the contact center application may maintain a more accurate expected wait time for queued contacts.

In accordance with another embodiment of the present disclosure, when an agent chooses a template (e.g., an email template, i.e., a customizable outline of an email message; or a recording of the reading of a required disclosure, etc.) in order to reply to a customer contact, an agent desktop client may inform the contact center in real-time that a template is being used to respond to the customer. This knowledge allows the contact center application to predict more accurately a length of time that the agent will spend on the contact.

Figure 3:
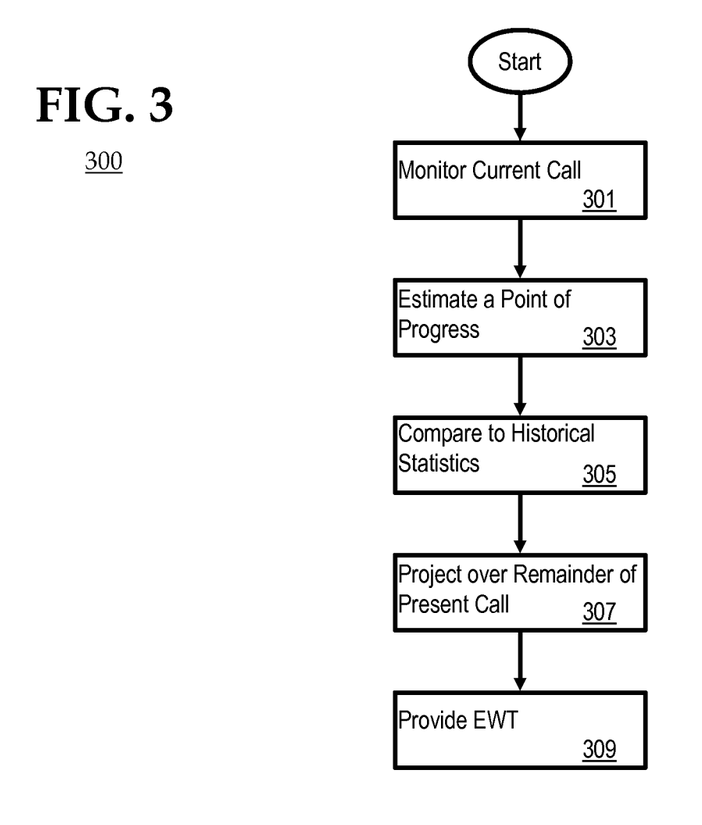
FIG. 3 illustrates at a high level of abstraction a method in accordance with an embodiment of the present invention.

FIG. 3 illustrates at a high level of abstraction a method 300 in accordance with an embodiment of the invention. Method 300 may be useful for, e.g., producing an estimated waiting time. Method 300 may be carried out at least in part by a processor coupled to a memory, the memory configured to store at least in part instructions that, when carried out by the processor, perform at least a portion of method 300. Method 300 begins at step 301, at which monitoring by a monitor circuit of a current call or other communication session may begin. Monitoring may include monitoring an audio call, monitoring the audio and/or video portion of a video call, monitoring textual messages such as chat/IM sessions, etc., as may be described earlier. The monitoring may be a monitoring of the content of the call by, e.g., semantic analysis.

Next, control of method 300 transitions to step 303, at which a point of progress of the monitored call may be estimated by a processor. The point of progress may be an estimate of, e.g., at what point during the conduct of a substantially scripted call that the present call is at in real-time, as may be described above in further detail. For example, the point of progress may be the first of three disclosures required to be read, or the point at which certain information is provided (e.g., SSN, address, authentication information, etc.). The estimate may be based upon audio, video and/or textual matching techniques as described above in further detail.

Next, control of method 300 transitions to step 305, at which the estimated point of progress for the current call may be compared by a processor to relevant historical statistics. The comparison may be, e.g., of how long previous calls have taken to arrive at a similar point in a similar call. The scope of relevant historical statistics may be statistics for previous calls that share a characteristic with the current call, such as sharing the identity of the caller, a group membership of the caller (e.g., an employer, an affiliation, etc.), a status of the caller (e.g., present customer, prospective customer, former customer), the reason for calling, characteristics of the call itself (e.g., geographic origins if callers from some regions such as NYC are apt to speak faster than callers from other regions such as the southern portion of the U.S.), and so forth, as may be described above in further detail.

Next, control of method 300 transitions to step 307, at which a projection of the duration of the remainder of the call may be estimated by a processor based upon the comparison of the estimated point of progress to the relevant historical statistics, as may be described above in further detail. For example, the projection may be based upon how the point of progress of the present call compares to the relevant historical statistic (e.g., 20% higher, 10% lower, etc.), and project the comparison to the remainder of the call. Or, in other embodiments, the projection may be weighted according to the types or groups of responses provided so far, compared to (or weighted by) the remaining types or groups of responses still to be provided in the present call.

Next, control of method 300 transitions to step 309, at which an expected wait time is provided by a communication circuit. For example, an expected wait time may be provided by a first communication circuit to contact center applications in order to better manage contact center operations. Alternatively or in addition, an expected wait time may be provided by a second communication circuit to one or more callers waiting in queue to inform the callers how much longer they may be waiting. The expected waiting time provided to callers may differ from the expected waiting time provided to contact center application. Such a difference in EWT may be used to help manage customer expectations in light of customer perceptions of elapsed time. An example of a communication circuit is a transmitter as previously described.

Embodiments in accordance with the present disclosure provide a relatively more accurate representation of contact center metrics, thus improving the user experience as well as the overall contact center operations. By analyzing voice conversations in real-time, embodiments may intelligently predict remaining call length of the present call, in order to provide a more accurate estimate of expected wait time for subsequent calls.

Embodiments of the present invention include a system having one or more processing units coupled to one or more memories. The one or more memories may be configured to store software that, when executed by the one or more processing unit, allows practice of embodiments described herein, at least by use of processes described herein, including at least in FIG. 3, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method to calculate an expected waiting time (EWT) of a caller to a contact center, comprising:
monitoring, by a processor of the contact center, a content of a present communication session, wherein the content comprises one or more of an audio portion, a video portion, or a textual portion of the present communication session;
estimating, by the processor of the contact center, based on the content of the present communication session, a point of progress of the present communication session;
comparing, by the processor of the contact center, the point of progress to a historical statistic, wherein the comparing comprises:
generating, by the processor of the contact center, a comparison of the content of the present communication session to a plurality of required statements to identify a match; and
determining, by the processor of the contact center, whether a statistical confidence of the match is above a predetermined threshold;
calculating, by the processor of the contact center, based on the comparison of the point of progress to the historical statistic, a projection of a duration of a remainder of the present communication session;
estimating, by the processor of the contact center, the EWT based upon the projection of the duration of the remainder of the present communication session; and providing, by the processor of the contact center, the EWT to a communications circuit.

2. The method of claim 1, wherein monitoring the content of the present communication session comprises semantic analysis of an audio stream.

3. The method of claim 1, wherein monitoring the content of the present communication session comprises monitoring visible actions of a participant of the present communication session.

4. The method of claim 1, wherein estimating the point of progress of the present communication session comprises searching for monitored content in a predetermined script.

5. The method of claim 1, wherein estimating the point of progress of the present communication session further comprises:
    determining a group membership of the monitored content; and
    searching for a member of the group membership in a predetermined script.

6. The method of claim 1, wherein comparing the point of progress comprises making a comparison of the point of progress of the present communication session to a historical communication session that shares a characteristic with the present communication session.

7. The method of claim 1, wherein calculating the projection comprises weighting types of future responses by response times of previous responses of a same respective type in the present communication session.

8. The method of claim 1, wherein providing the EWT comprises:
    providing a first EWT to a first communication circuit in communication with a contact center application; and
    providing a second EWT to a second communication circuit in communication with a caller waiting in queue.

9. The method of claim 8, wherein the second EWT is different than the first EWT.

10. The method of claim 1, wherein determining whether a statistical confidence of the comparison is above a predetermined threshold comprises weighting a first group of words more heavily than a second group of words.

11. A system to calculate an expected waiting time (EWT) of a caller to a contact center, comprising:
    a memory device storing executable instructions; and
    a processor in communication with the memory device, wherein the processor when executing the executable instructions:
        monitors a content of a present communication session, wherein the content comprises one or more of an audio portion, a video portion, or a textual portion of the present communication session;
        estimates, based on the content of the present communication session, a point of progress of the present communication session;
        compares the point of progress to a historical statistic by:
            generating a comparison of the content of the present communication session to a plurality of required statements to identify a match; and
            determining whether a statistical confidence of the match exceeds a predetermined threshold;
        calculates, based on the comparison of the point of progress to the historical statistic, a projection of a duration of a remainder of the present communication session;
        estimates the EWT based upon the projection of the duration of the remainder of the present communication session; and
        provides the EWT to a communications circuit.

12. The system of claim 11, wherein the processor when executing the executable instructions semantically analyzes an audio media stream representative of the present communication session.

13. The system of claim 11, wherein the processor when executing the executable instructions monitors visible actions of a participant of the present communication session.

14. The system of claim 11, wherein the processor when executing the executable instructions estimates the point of progress of the present communication session by a search of monitored content in a predetermined script.

15. The system of claim 11, wherein the processor when executing the executable instructions estimates the point of progress of the present communication session by:
    determining a group membership of the monitored content; and
    searching for a member of the group membership in a predetermined script.

16. The system of claim 11, wherein the processor when executing the executable instructions compares the point of progress by making a comparison of the point of progress of the present communication session to a historical communication session that shares a characteristic with the present communication session.

17. The system of claim 11, wherein the processor calculates the projection by weighting types of future responses by response times of previous responses of a same respective type in the present communication session.

18. The system of claim 11, wherein the processor when executing the executable instructions:
    provides a first EWT to a first communication circuit in communication with a contact center application; and
    provides a second EWT to a second communication circuit in communication with a caller waiting in queue.

19. The system of claim 18, wherein the second EWT is different than the first EWT.

20. The system of claim 11, wherein the processor when executing the executable instructions determines whether a statistical confidence of the comparison is above a predetermined threshold by weighting a first group of words more heavily than a second group of words.

* * * * *